April 21, 1970  H. HACK  3,507,157
LIGHT BEAM UNBALANCE-INDICATING AND CORRECTING APPARATUS
Filed Nov. 14, 1966

United States Patent Office

3,507,157
Patented Apr. 21, 1970

3,507,157
LIGHT BEAM UNBALANCE-INDICATING AND CORRECTING APPARATUS
Heinrich Hack, Darmstadt, Germany, assignor to Carl Schenck Maschinenfabrik GmbH, Darmstadt, Germany, a corporation of Germany
Filed Nov. 14, 1966, Ser. No. 593,976
Claims priority, application Germany, Nov. 13, 1965, Sch 38,024
Int. Cl. G01n 1/38
U.S. Cl. 73—462                                4 Claims

ABSTRACT OF THE DISCLOSURE

A mask provides a line of light rotatable with a workpiece on an indicating screen and representing the position of the workpiece relative to correcting apparatus. A light spot is projected on the screen for indicating the magnitude and location of unbalance of the workpiece relative to the correcting apparatus. An indicator mask of two-dimensional configuration has a linear edge and indicates the amount of correction applied to the workpiece relative to the total magnitude of correction required. The mask rotates with the correcting apparatus.

---

Figure 1:
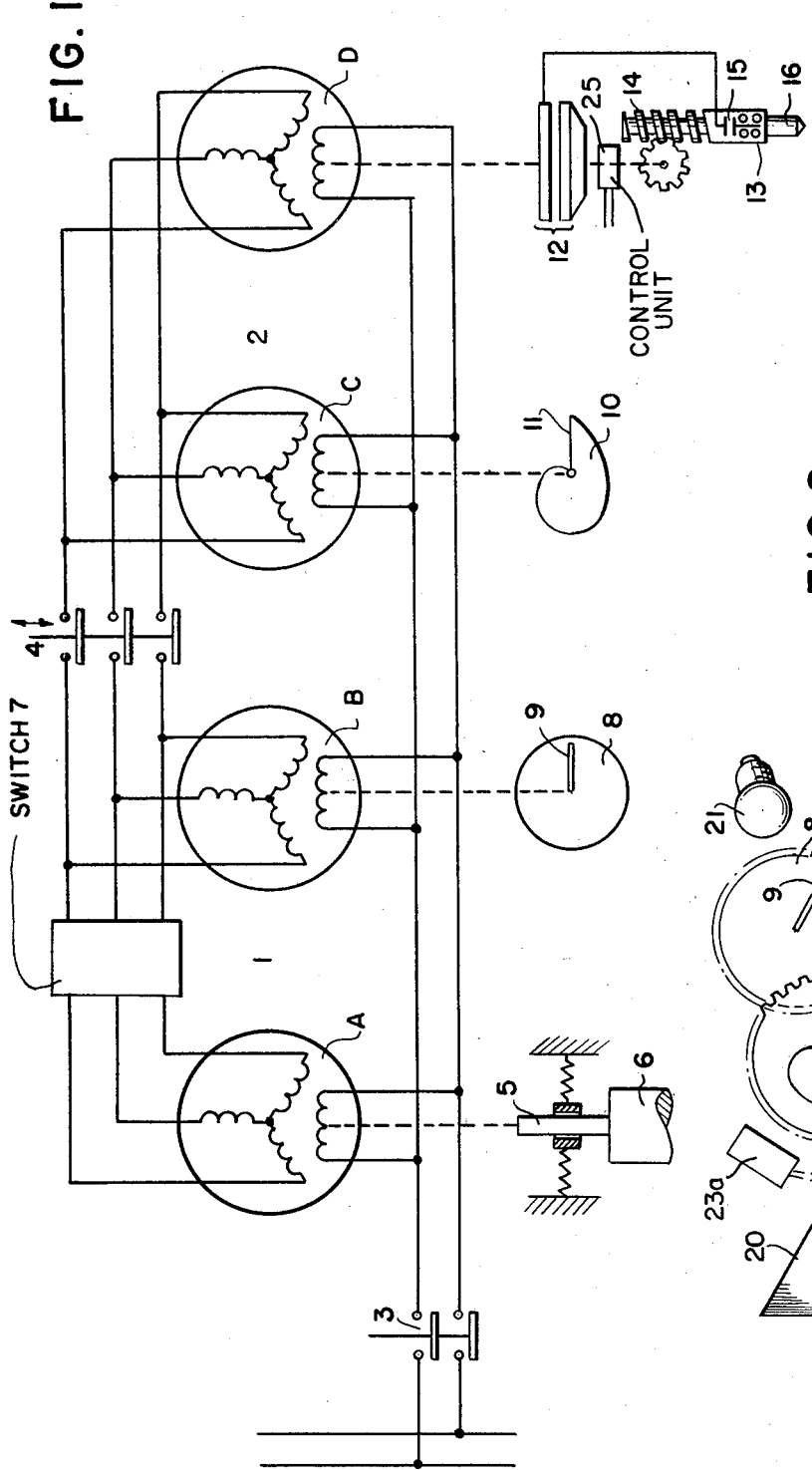

The present invention relates to light beam unbalance-indicating and correcting apparatus.

The unbalance-indicating and correcting apparatus of the present invention utilizes a light beam to indicate the angular position and the magnitude of unbalance in a rotary workpiece such as, for example, a shaft.

Unbalance-indicating apparatus utilized in combination with unbalance-correcting apparatus may provide a light beam which is focussed as a light spot on a raster screen to indicate the magnitude and position of unbalance in a workpiece. A device which rotates synchronously with the workpiece provides an additional light or shade marker such as, for example, a line. When the light spot and the light line are coincident on the screen, the point of coincidence indicates the point, position or location of unbalance, thereby facilitating the positioning of the unbalance-correcting apparatus. The utilization of the line indicator permits the rotation of the workpiece to the proper working position without interruption of the observation of the light spot which indicates the magnitude and position of the unbalance.

The principal object of the present invention is to provide a new and improved light beam unbalance-indicating apparatus. The light beam unbalance-indicating apparatus of the present invention provides an unbalance indication on a light line, thereby facilitating unbalance correction at the proper position or location and at the proper magnitude. The light beam unbalance-indicating apparatus of the present invention provides the unbalance indication on an indicating screen which obviates the need for written intelligence to indicate the unbalance magnitude and thereby avoids errors in reading and transmitting such written intelligence. In the light beam unbalance-indicating apparatus of the present invention, an image of the cross-section of the workpiece is projected on the indicating screen. The light beam unbalance-indicating apparatus of the present invention automatically terminates the operation of the unbalance-correcting apparatus upon the masking of the light spot and thereby enhances the accuracy of the unbalance correction since it limits the unbalance correction to the exact location or position indicated by the light spot. The light beam unbalance-indicating apparatus of the present invention is efficient, effective and reliable in operation.

In accordance with the present invention, unbalancing-indicating and correcting apparatus utilizes a light beam for indicating the magnitude and position of unbalance of a workpiece and unbalance-correcting means. An indicating screen is provided. Masking means provides a line of light rotatable with the workpiece on the indicating screen. An indicator mask is rotatable with the unbalance-correcting apparatus and indicates the amount of correction applied relative to the total magnitude of correction required.

A light spot is provided on the indicating screen for indicating the magnitude and location of unbalance of the workpiece relative to the correcting apparatus. Control means stops the unbalance-correcting means upon coincidence of the light spot and the line of light on the indicating screen.

Figure 2:
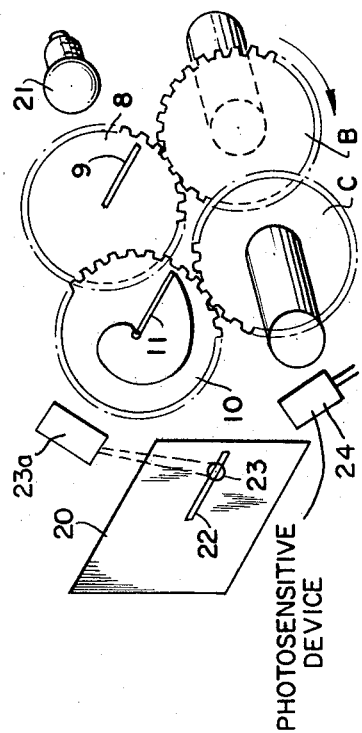

In order that the present invention may be readily carried into effect, it will now be described with reference to the accompanying drawing, wherein:

FIG. 1 is a schematic diagram, including a circuit diagram of an embodiment of a portion of the light beam unbalance-indicating apparatus of the present invention; and FIG. 2 is a schematic diagram of another portion of the embodiment of FIG. 1 and part of FIG. 1 on an enlarged scale.

In FIG. 1, a first synchro-transmitter and synchro-receiver system 1 comprises a transmitter A and a receiver B, and a second synchro-transmitter and synchro-receiver system 2 comprises a transmitter D and a receiver C. The synchro-transmitter and synchro-receiver systems 1 and 2 are electrically energized and deenergized via an input switch 3 which is connected between the power lines and the synchro-transmitter and synchro-receiver systems 1 and 2. The synchro-transmitter and synchro-receiver systems 1 and 2 are electrically connected to each other via a coupling switch 4.

The transmitter A of the synchro-transmitter and synchro-receiver system 1 is coupled to the rotary workpiece, which may comprise, for example, a rotor or shaft 6, by any suitable means. The transmitter A may be coupled to a drive shaft 5 and which is coaxially coupled to and drives the workpiece 6. The transmitter A is so coupled to the shaft 5 or the workpiece 6, that said transmitter rotates synchronously with said workpiece. The receiver B rotates at a slower speed or at few revolutions per unit time than the workpiece 6. This may be achieved by any suitable means such as, for example, a brake control device or zero speed switch 7 which is connected between the transmitter A and the receiver B. The brake control switch 7 rotates with the shaft 5 at the same speed as said shaft and the workpiece 6. At a very low rotary speed of the shaft 5, the brake control switch connects the receiver B to the transmitter A and closes the coupling switch 4 at the same time to connect the synchro-receiver system 2 to the synchro-receiver system 1.

A masking disc 8 having a substantially linearly extending slot 9 formed therethrough is coupled to and rotates with the receiver B of the synchro-transmitter and synchro-receiver system 1. Each of the synchro-transmitter and synchro-receiver systems 1 and 2 comprises a rotary field system. The synchro-transmitter and synchro-receiver system 2, when coupled to the synchro-transmitter and synchro-receiver system 1 via the coupling switch 4, rotates synchronously with the workpiece 6.

An indicator mask or template 10 is coupled to and rotates with the receiver C of the synchro-transmitter and synchro-receiver system 2. The indicator mask 10 is of two-dimensional substantially spiral configuration and has a linear edge 11 extending from its axis to its curvilinear periphery.

An unbalance-correcting or processing device or tool 13 such as, for example, a drilling or boring device, is coupled to and rotates with the transmitter D of the synchro-transmitter and synchro-receiver system 2. The unbalance-correcting device 13 is coupled to the transmitter D via a coupling 12, an axial direction feed gear 14 and a control contact 15. The unbalance-correcting device 13 comprises a drill or borer 16.

In FIG. 2, the receiver B of the rotary field system 1 and the receiver C of the rotary field system 2 control the masking disc 8 and the indicator disc 10, respectively. The masking disc 8 is coaxially positioned with the indicator disc 10. The indicator mask 10 may have a two-dimensional substantially spiral configuration with a linear edge 11 extending from its axis to its curvilinear periphery formed therethrough, rather than be in the form of such configuration, as shown in FIG. 1.

A source of light 21 is positioned in spaced relation with an indicating screen 20 with the masking disc 8 and the indicator mask 10 postioned between said source and said screen. The source of light 21 projects a line of light 22 on the indicating screen 20 via the slot 9 of the masking disc 8. A light spot 23 is also projected on the indicating screen 20 from a source of light spot 23a. The light spot 23 is provided by the source of light spot 23a in accordance with the disclosures of U.S. Patent No. 2,722,830 and U.S. Reissue Patent No. 24,620.

The light beam unbalance-indicating apparatus of the present invention operates in the following manner. After the magnitude and position or location of unbalance of the workpiece 6 is determined, the rotating apparatus is decelerated by any suitable means such as, for example, braking. The receiver B of the rotary field system 1 and the masking disc 8 are connected via the zero speed switch 7 to the transmitter A of said rotary field system shortly before the the workpiece 6 comes to a standstill. The receiver B and the masking disc 8 then rotate synchronously with the transmitter A, but at a lower speed than said transmitter.

The masking disc 8 is coupled to the receiver B and the indicator mask 10 is coupled to the receiver C and said disc and said mask are coaxially aligned with each other, so that the slot 9 of said disc is in alignment with the linear edge 11 of said mask. Thus, since the rotary field system 2, including the indicator mask 10, rotates synchronously with and in angular correspondence with the rotary field system 1, the source of light 21 projects the line of light 22 on the indicating screen 20.

After the apparatus comes to a standstill, the workpiece 6 is at a standstill at a correct angular position of unbalance. The correct angular position is indicated by the coincidence of the light spot 23 with the line of light 22.

The unbalance is then corrected. That is, the workpiece 6 is then balanced. This is accomplished by opening the coupling switch 4 to disconnect the rotary field system 2 from the rotary field system 1. The rotary field systems 1 and 2 are then mechanically and electrically independent from each other. Thus, the rotary field system 1 indicates the magnitude and location or position of unbalance and the rotary field system 2 is then made independent of the rotary field system 1 and balances the workpiece 6.

The rotary field system 2 balances the workpiece 6 by any suitable means such as, for example, the removal of material from said workpiece by drilling or boring. The borer or drill 16 is moved toward the workpiece 6 in an axial direction by the axial direction feed gear 14. When the drill or borer 16 abuts or contacts the workpiece 6, the control contact 15 is closed and causes energization or operation of the coupling 12 to operate or rotate the rotary field system 2. The transmitter D of the rotary field system 2 is thus rotated in correspondence with the feeding of the drill or borer 16 in an axial direction.

The receiver C of the rotary field system 2 is rotated synchronously with the transmitter D and rotates the indicator mask 10, which is coupled thereto. When the indicator mask 10 rotates, it covers or masks the line of light 22 gradually from the end of said line of light closest to the axis of the masking disc 8 to the end of said line of light farthest from said axis. The workpiece 6 is correctly balanced when, for example, the indicator mask 10 covers or masks the line of light 22 from the end of said line of light closest to the axis of the masking disc 8 to the center of the light spot 23.

Upon completion of the unbalance-correcting operation, the rotary field systems 1 and 2 are coupled to each other by the closing of the coupling switch 4. The coupling switch 4 may be operated either automatically or manually. When the coupling switch 4 is closed, the rotary field systems 1 and 2 can rotate in synchronism with the next workpiece.

When the receiver B is connected to the transmitter A, via the zero speed device 7, shortly before the workpiece 6 comes to a standstill, the line of light 22 appears on the indicating screen 20 as a rotating line. The line of light 22 represents the position or zero position of the workpiece 6 relative to the correcting apparatus. The light spot 23 indicates the angular position or location and the magnitude of unbalance of the workpiece 6 relative to the correcting apparatus on the indicating screen 20, relative to the zero position of said workpiece.

The unbalance-correcting or processing device 13 is positioned in the zero position plane of the workpiece 6. When the workpiece 6 is at a standstill, the line of light 22 comes to a standstill at some position on the indicating screen 20. The balancing apparatus causes rotation of the line of light 22 until it coincides with the light spot 23. When the light spot 23 and the line of light 22 coincide, the drill or borer 16 has worked into the workpiece 6 at the position or location of unbalance for the exactly correct distance. The workpiece 6 is thus properly balanced at the proper location with accuracy, efficiency, effectiveness and reliability. The workpiece 6 may be rotated by any suitable automatic or manual means.

Upon coincidence of the light spot 23 and the line of light 22 on the indicating screen 20, the unbalance of the workpiece 6 is corrected, as described. A photo-sensitive device 24, in operative proximity with the screen 20, detects the coincidence of the light spot 23 and the line of light 22 and stops the unbalance-correcting drill or borer 16 via a control unit 25 by electrical signal.

While the invention has been described by means of a specific example and in a specific embodiment, I do not wish to be limited thereto, for obvious modifications will occur to those skilled in the art without departing from the spirit and scope of the invention.

I claim:

1. In unbalance-indicating and correcting apparatus utilizing a light beam for indicating the magnitude and position of unbalance of a workpiece and unbalance-correcting apparatus, an indicating screen, masking means for providing a straight line of light rotatable with said workpiece on said indicating screen about an axis perpendicular to said screen and line and representing the position of said workpiece relative to the correcting apparatus, means for projecting a light spot on said indicating screen for indicating the magnitude and location of unbalance of the workpiece relative to said correcting apparatus, so that when the workpiece is rotated to a position where the line and spot coincide the unbalance-correcting means is properly oriented for correcting the unbalance, and an indicator mask of two-dimensional configuration having a linear edge for indicating the amount of correction applied relative to the total magnitude of correction required, said indicator mask being rotatable with said unbalance-correcting apparatus.

2. In unbalance-indicating and correcting apparatus as claimed in claim 1, control means for stopping said unbalance-correcting means upon coincidence of said light spot and said line of light on said indicating screen.

3. In unbalance-indicating and correcting apparatus as claimed in claim 1, wherein said indicator mask is of two-dimensional substantially spiral configuration having a linear edge extending from its axis to its curvilinear periphery.

4. In unbalance-indicating and correcting apparatus as claimed in claim 3, wherein said masking means comprises a masking disc having a substantially linearly extending slot formed therethrough, said masking disc and said indicator mask being coaxially positioned in spaced relation to each other.

References Cited

UNITED STATES PATENTS

Re. 24,620    3/1959    Federn et al. _____ 73—463

JAMES J. GILL, Primary Examiner